United States Patent
Schroth et al.

(10) Patent No.: US 10,211,769 B2
(45) Date of Patent: Feb. 19, 2019

(54) CONTROLLER FOR A SEPARATELY EXCITED ELECTRIC GENERATOR IN A VEHICLE ELECTRICAL SYSTEM OF A MOTOR VEHICLE

(71) Applicant: Continental Teves AG & Co. oHG, Frankfurt (DE)

(72) Inventors: Hans Schroth, Neuberg (DE); Michael Kutzner, Sulzbach (DE)

(73) Assignee: CONTINENTAL TEVES AG & CO OHG, Frankfurt (DE)

( * ) Notice: Subject to any disclaimer, the term of this patent is extended or adjusted under 35 U.S.C. 154(b) by 0 days.

(21) Appl. No.: 15/523,492

(22) PCT Filed: Sep. 16, 2015

(86) PCT No.: PCT/EP2015/071266
§ 371 (c)(1),
(2) Date: May 1, 2017

(87) PCT Pub. No.: WO2016/066321
PCT Pub. Date: May 6, 2016

(65) Prior Publication Data
US 2017/0310260 A1    Oct. 26, 2017

(30) Foreign Application Priority Data
Oct. 31, 2014   (DE) .......................... 10 2014 222 337

(51) Int. Cl.
*H02P 9/10* (2006.01)
*H02P 9/30* (2006.01)
*H02P 9/48* (2006.01)

(52) U.S. Cl.
CPC ............... *H02P 9/10* (2013.01); *H02P 9/302* (2013.01); *H02P 9/48* (2013.01)

(58) Field of Classification Search
USPC ........................................ 322/24, 25, 28, 59
See application file for complete search history.

(56) References Cited

U.S. PATENT DOCUMENTS

| 4,117,389 | A | * | 9/1978 | Hazumi | H02M 5/45 322/28 |
| 4,128,802 | A | * | 12/1978 | Gansert | H02J 7/248 257/701 |

(Continued)

FOREIGN PATENT DOCUMENTS

| DE | 19944621 A1 | 3/2001 | ............... H02J 7/14 |
| DE | 10040112 A1 | 2/2002 | ............... G01L 3/00 |

(Continued)

OTHER PUBLICATIONS

German Office Action, Application No. 102014222337.7, 6 pages, dated Apr. 14, 2015.

(Continued)

*Primary Examiner* — Pedro J Cuevas
(74) *Attorney, Agent, or Firm* — Slayden Grubert Beard PLLC

(57) ABSTRACT

The present disclosure relates to motor vehicles. The teachings thereof may be embodied in the operation and control of an externally excited electrical generator in an on-board electrical system of a motor vehicle. An example method may include: setting the excitation voltage within the scope of regulating an actual output voltage of the generator at a predetermined setpoint output voltage of the generator; evaluating load requirements of at least one peak load consumer supplied from the on-board electrical system; identifying exceptional situations based on the load requirements; and in the event of an exceptional situation, setting an associated temporary excitation output voltage of the generator.

9 Claims, 4 Drawing Sheets

(56) References Cited

U.S. PATENT DOCUMENTS

| | | | | |
|---|---|---|---|---|
| 4,262,209 | A * | 4/1981 | Berner | F02D 29/06 |
| | | | | 174/DIG. 15 |
| 4,410,848 | A * | 10/1983 | Frierdich | H02P 9/107 |
| | | | | 322/25 |
| 4,890,073 | A * | 12/1989 | Flachenecker | H03B 5/08 |
| | | | | 331/167 |
| 5,061,889 | A * | 10/1991 | Iwatani | H02J 7/1446 |
| | | | | 322/28 |
| 5,172,046 | A * | 12/1992 | Dittner | H02J 7/1492 |
| | | | | 322/89 |
| 6,049,198 | A * | 4/2000 | Schenk | H02P 9/307 |
| | | | | 322/25 |
| 6,147,474 | A * | 11/2000 | Koss | H02P 9/08 |
| | | | | 322/28 |
| 6,218,814 | B1 * | 4/2001 | Kohl | H02J 7/1446 |
| | | | | 322/19 |
| 6,351,104 | B1 * | 2/2002 | Koelle | H02J 7/1438 |
| | | | | 322/22 |
| 6,489,753 | B1 * | 12/2002 | Patterson | H02J 7/0014 |
| | | | | 320/162 |
| 6,907,793 | B2 | 6/2005 | Reutlinger et al. | 73/862.28 |
| 7,605,569 | B2 * | 10/2009 | Kaltenegger | H02P 9/48 |
| | | | | 322/24 |
| 7,812,468 | B2 | 10/2010 | Kuroda et al. | 290/40 C |
| 8,847,559 | B1 * | 9/2014 | Horne | H02P 9/46 |
| | | | | 307/105 |
| 8,963,509 | B2 | 2/2015 | Micko et al. | 322/44 |
| 8,963,510 | B1 * | 2/2015 | Larson | H02P 9/02 |
| | | | | 310/178 |
| 9,079,503 | B2 * | 7/2015 | Daigle | B60L 11/02 |
| 9,641,114 | B2 * | 5/2017 | Horne | H02P 9/02 |
| 9,823,309 | B2 * | 11/2017 | Mehringer | G01R 31/343 |
| 2002/0027425 | A1 | 3/2002 | Asao et al. | 322/28 |
| 2009/0195223 | A1 | 8/2009 | Maehara | 322/24 |

FOREIGN PATENT DOCUMENTS

| | | | |
|---|---|---|---|
| DE | 102007000618 A1 | 8/2008 | H02P 9/04 |
| DE | 102008011465 A1 | 9/2009 | H02K 19/30 |
| DE | 102010029967 A1 | 12/2011 | B60R 16/03 |
| FR | 2926414 A1 | 7/2009 | H02P 9/10 |
| JP | 2008259385 A | 10/2008 | B60R 16/03 |
| WO | 2016/066321 A1 | 5/1916 | B60R 16/03 |
| WO | 2009/056964 A2 | 5/2009 | H02P 9/10 |

OTHER PUBLICATIONS

International Search Report and Written Opinion, Application No. PCT/EP2015/071266, 23 pages, dated Nov. 30, 2015.

* cited by examiner

CONTROLLER FOR A SEPARATELY EXCITED ELECTRIC GENERATOR IN A VEHICLE ELECTRICAL SYSTEM OF A MOTOR VEHICLE

CROSS-REFERENCE TO RELATED APPLICATIONS

This application is a U.S. National Stage Application of International Application No. PCT/EP2015/071266 filed Sep. 16, 2015, which designates the United States of America, and claims priority to DE Application No. 10 2014 222 337.7 filed Oct. 31, 2014, the contents of which are hereby incorporated by reference in their entirety.

TECHNICAL FIELD

The present disclosure relates to motor vehicles. The teachings thereof may be embodied in the operation and control of an externally excited electrical generator in an on-board electrical system of a motor vehicle, e.g., to methods and apparatuses for controlling the excitation voltage of a generator of this kind, and also to a generator of this kind.

BACKGROUND

The prior art discloses externally excited electrical generator in an on-board electrical system of a motor vehicle and methods including setting the excitation voltage to regulate an actual output voltage of the generator at a predetermined setpoint output voltage of the generator. The apparatuses known for this purpose usually comprise:
  a drivable DC/DC converter supplied from the on-board electrical system, for generating a (variable) excitation voltage for the generator, and
  a comparison device for comparing an actual output voltage of the generator with a predetermined setpoint output voltage of the generator and for outputting a deviation signal (as drive signal) to the DC/DC converter to thereby regulate the actual output voltage at the setpoint output voltage.

The generator is usually rotationally driven by mechanical coupling of the generator to an internal combustion engine (for example petrol or diesel engine) of the motor vehicle. The internal combustion engine can provide a rotary power used directly for driving the motor vehicle in question, or else serving, for example, as a so-called "range extender" of a series hybrid motor vehicle solely to drive the electrical generator.

During the abovementioned regulation of the generator output voltage, an actual output voltage is continuously detected as a control variable, compared with the predetermined setpoint output voltage as a reference variable, and influenced as part of the process of matching the actual output voltage to the setpoint output voltage by setting the excitation voltage as stated.

SUMMARY

Even though the known methods and apparatuses are suitable for maintaining a desired on-board electrical system voltage in most operating situations of the electrical system of the motor vehicle, deviations in the generator output voltage from the predetermined setpoint output voltage may occur when any "peak load consumer" supplied from the on-board electrical system suddenly leads to a significantly increased electrical power requirement. In situations such as this, the conventional regulation is often not able to or is too "slow" in meeting this increased power requirement by correspondingly increasing the excitation voltage and consequently the excitation current as quickly as would be desired. This problem is, for example, particularly important when abruptly connecting safety-critical systems, such as systems for forced electrical operation of a brake of the motor vehicle for example, since a drop in the on-board electrical system voltage has an adverse effect on proper functioning of the safety-critical system in cases such as this.

The teachings of the present disclosure provide, for example, a method and an apparatus, useful in the event of abrupt and significant changes in the power requirement, to control of the generator suitable for preventing relatively large deviations in the actual output voltage from the setpoint output voltage.

In some embodiments, a method for controlling an excitation voltage (Uerr) of an externally excited electrical generator (G) in an on-board electrical system (B) of a motor vehicle, may comprise: setting the excitation voltage (Uerr) within the scope of regulating an actual output voltage (Ugen) of the generator (G) at a predetermined setpoint output voltage (Ugenset) of the generator (G), and, based on an evaluation of load requirements (h1, h2) of at least one peak load consumer (SL1, SL2) which is supplied from the on-board electrical system (B), exceptional situations are detected, and in that, in the event of an exceptional situation, modified setting of the excitation voltage (Uerr) is performed.

In some embodiments, the load requirements (h1, h2) are communicated by means of a digital bus system of the motor vehicle and are evaluated by means of a program-controlled device (16).

In some embodiments, the modified setting provides a temporary interruption in the regulation and setting of the excitation voltage (Uerr) depending on an exception control signal (s1; s2) which is generated depending on a result of the evaluation.

In some embodiments, setting the excitation voltage (Uerr) to negative voltage values and/or to voltage values with an absolute value which is increased in relation to the on-board electrical system voltage (Ubat) is made possible.

Some embodiments may include a method for operating an externally excited electrical generator (G) in an on-board electrical system (B) of a motor vehicle, comprising controlling an excitation voltage (Uerr) of the generator as described above, characterized in that, based on an evaluation of load requirements (h1, h2) of at least one peak load consumer (SL1, SL2) which is supplied from the on-board electrical system (B), exceptional situations are detected, and in that, in the event of an exceptional situation, modified current supply, which is realized by driving a switch device (S1; S2), to an excitation coil (40c; 40d) of the generator (G), which excitation coil is formed from at least two coil elements (40c-1, 40c-2; 40d-1, 40d-2) which can be supplied with current individually, is performed.

Some embodiments may include an apparatus (10; 10a) for carrying out a method as described above, comprising: a drivable DC/DC converter (12; 12a), which is supplied from the on-board electrical system (B), for generating an excitation voltage (Uerr) for the generator (G), a comparison device (14; 14a) for comparing an actual output voltage (Ugen) of the generator (G) with a predetermined setpoint output voltage (Ugenset) of the generator (G) and for outputting a deviation signal (a) to the DC/DC converter (12; 12a) in order to regulate the actual output voltage (Ugen) at the setpoint output voltage (Ugenset), characterized in that the apparatus (10; 10a) comprises an evaluation device (16; 16a) for evaluating load requirements (h1, h2) of at least one peak load consumer (SL1, SL2), which is supplied from the on-board electrical system (B), and for detecting exceptional situations, and an exception control device (18; 18a) for implementing modified setting of the excitation voltage (Uerr) in the event of an exceptional situation, or the DC/DC converter (12; 12a) is designed to allow setting of the excitation voltage (Uerr) to negative voltage values and/or to voltage values with an absolute value which is increased in relation to the on-board electrical system voltage (Ubat), or the apparatus (10; 10a) comprises an evaluation device (16; 16a) for evaluating load requirements (h1, h2) of at least one peak load consumer (SL1, SL2), which is supplied from the on-board electrical system (B), and for detecting exceptional situations, and an exception control device (18; 18a) for implementing modified current supply to an excitation coil (40c; 40d) of the generator (G), which excitation coil is formed from at least two coil elements (40c-1, 40c-2; 40d-1, 40d-2) which can be supplied with current individually, which is realized by driving a switch device (S3; S4-S6).

BRIEF DESCRIPTION OF THE DRAWINGS

The invention will be described further below on the basis of exemplary embodiments with reference to the appended drawings, in which.

DETAILED DESCRIPTION

Figure 1:
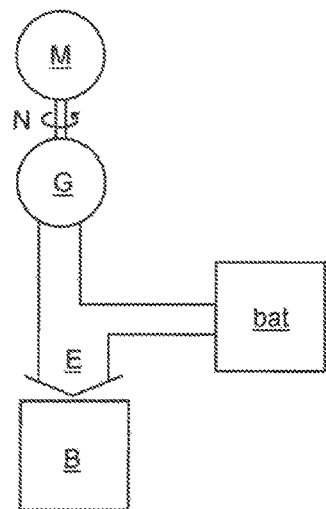
FIG. 1 shows a block diagram for illustrating an energy flow in an on-board electrical system of a motor vehicle for a discharging situation of an electrical energy store.

Within the present disclosure, the term "externally excited electrical generator" identifies a rotationally driven electrical machine which converts a supplied mechanical rotary power into an electrical power by means of induction, wherein a magnetic field required for the induction is generated by current supplied to an excitation coil of the generator.

The term "excitation voltage" is that voltage which, when applied to the excitation coil of the generator, drives the excitation current through the excitation coil.

The term "output voltage (of the generator)" identifies the, usually rectified, voltage, which is induced in the generator, for supplying the on-board electrical system. In the case of an on-board electrical system which is buffered by an electrical energy store (such as a lead-acid rechargeable battery for example), a desired setpoint output voltage of the generator usually corresponds to a so-called end-of-charge voltage of the energy store in question (for example approximately 14 V).

In some embodiments, methods of the kind described above, based on an evaluation of load requirements of at least one peak load consumer which is supplied from the on-board electrical system, may detect exceptional situations and, in the event of an exceptional situation, modify setting of the excitation voltage.

Some embodiments may include an apparatus comprising an evaluation device for evaluating load requirements of at least one peak load consumer, which is supplied from the on-board electrical system, and for detecting exceptional situations, and furthermore an exception control device for implementing modified setting of the excitation voltage in the event of an exceptional situation.

In this case, the term "load requirement" identifies an item of information available to the peak load consumer (for example electrically operated brake system) in question immediately before it is actually activated and concerns the electrical power requirement associated with the activation of the said peak load consumer. Load requirements of this kind or corresponding load requirement signals can be generated in an analog or digital form (data signal) by the peak load consumer in question itself (for example abovementioned brake system) or by a device which initiates connection and disconnection of peak load consumers of this kind (for example a central control device for the motor vehicle electronics system), and can be output.

By virtue of evaluating the load requirements of at least one peak load consumer, for example on the basis of predetermined criteria, it is possible to detect exceptional situations in which the regulation which would normally take place would be too slow to meet the load requirement. It is then possible in exceptional situations of this kind to set the excitation voltage in a modified manner, that is to say not based on simple regulation of the described kind, on the basis of the evaluation result. The teachings herein may therefore realize, in particular, an adjustment method with optimized dynamic performance of an electrical generator (for example claw pole generator) in a motor vehicle.

If the load requirements of a plurality of peak load consumers are evaluated, modified setting of the excitation voltage can be provided in the case of a simultaneous or temporally overlapping occurrence of load requirements of a plurality of peak load consumers, this taking into account the corresponding "total requirement" of electrical power. Therefore, for example, a time-dependent total requirement can be ascertained (for example calculated) by the evaluation device and communicated to the exception control device in which parameters of the modified setting, which parameters are suitable for the specific case, can then be ascertained (for example calculated).

In some embodiments, the modified setting does not influence the constantly predefined setpoint output voltage of the generator. In some embodiments, the modified setting is suitable for prespecifying a temporarily changed, e.g., increased, setpoint output voltage of the generator and for realizing tracking of this changed setpoint output voltage by the actual output voltage.

In some embodiments, the load requirements are communicated by means of a digital bus system of the motor vehicle and are evaluated by means of a program-controlled device.

The digital bus system can be formed, for example, in line with a conventional standard (such as CAN, Flexray, LIN etc. for example). In this case, the program-controlled device has the functionality of the evaluation device provided in the apparatus for evaluating load requirements and for detecting exceptional situations.

The load requirement of a specific peak load consumer can comprise, for example, an item of information relating to a time period of the particular (additional) power requirement and also relating to the quantitative profile of this particular power requirement within this time period. The particular power requirement can be constant or else defined as a time-dependent requirement in said time period.

In some embodiments, the modified setting of the excitation voltage is implemented by an exception control device. In some embodiments, the functionality of the exception control device is provided by the abovementioned program-controlled device. In this case, the program-controlled device therefore functions both for evaluating the load requirements and for implementing the modified setting of the excitation voltage.

In some embodiments, the modified setting provides a temporary interruption in the regulation and, instead, setting of the excitation voltage depending on an exception control signal which is generated depending on a result of the evaluation. In some embodiments, the exception control signal is generated by the exception control device.

An "interruption in the regulation" and, instead, implementing modified setting can be realized in various ways. By way of example, a switch device which is driven by the exception control device can be used for an interruption of this kind. In particular, the switch device can comprise, for example, a changeover switch which is arranged and driven in such a way that, in an exceptional situation, a signal which is normally forwarded at a specific point in the control loop is "discarded" (not forwarded) and, instead, a signal which is generated by the exception control device is introduced into the control loop at this point.

In some embodiments, the setting of the excitation voltage, which setting is provided during the regulation, is maintained as such, but not on the basis of a result of the comparison between the actual output voltage and the setpoint output voltage of the generator, but rather on the basis of said exception control signal as a replacement for the deviation signal. In other words, in such an embodiment, the normally active regulation loop is disconnected at that point at which the deviation signal is input into an "actuating device" (for example drivable DC/DC converter) and, instead, the exception control signal, which is specially generated (for example calculated) for the exceptional case, is input into said actuating device.

In some embodiments, the exception control signal generated by the exception control device is not used as a replacement for the deviation signal of the regulation, but rather as a control signal for driving an actuating device which is provided specially for the exceptional case and which, in the exceptional situation, is provided to output the excitation voltage for the generator. In other words, in this embodiment, the normal control loop is interrupted at a point between the normally used actuating device and the generator, and an excitation voltage which is specially generated in the exceptional case is applied to the generator at this point.

In the case of modified setting of the excitation voltage, it is possible, as an alternative or in addition to interrupting the regulation, to provide "admixing" of a control signal, which is provided by the exception control device, at a specific point of the control loop. This can be realized, for example, by an addition node, which is arranged at this point, for addition (possibly weighted addition) of a signal, which is forwarded at this point in the normal situation in the control loop, to a control signal which is generated in the exceptional situation by the exception control device.

In some embodiments, setting the excitation voltage to negative voltage values and/or to voltage values with an absolute value which is increased in relation to the on-board electrical system voltage is made possible. In some embodiments, the DC/DC converter allows setting of the excitation voltage to negative voltage values and/or to voltage values with an absolute value which is increased above the on-board electrical system voltage. The ability to set the excitation voltage at negative voltage values may allow an excitation current which flows through the excitation coil to be particularly rapidly reduced as required. The ability to set said excitation voltage at voltage values with an absolute value which is increased in relation to the on-board electrical system voltage has the advantage that an excitation current which flows through the excitation coil can be changed (that is to say, for example, also raised or increased) particularly rapidly.

In some embodiments, the excitation voltage can be set both to negative voltage values and also to voltage values with an absolute value which is increased in relation to the on-board electrical system voltage. The absolute value of the maximum (positive) excitation voltage and/or the absolute value of the minimum (negative) excitation voltage can be, for example, at least 2 times, in particular at least 3 times, the absolute value of the on-board electrical system voltage (nominal voltage). In one embodiment, the (possibly voltage-limited) range for Uerr extends to at least +/−20 V, in particular to at least +/−40 V.

The particular ability to set the excitation voltage can be provided, for example, within the regulation, which is used in "normal situations", of the actual output voltage to the predetermined setpoint output voltage in order to thereby advantageously reduce the inertia of the change in the excitation current in normal operating situations. In some embodiments, setting the excitation voltage can also be provided within the scope of the abovementioned modified setting of the excitation voltage.

In some embodiments, a method includes controlling an excitation voltage of an externally excited electrical generator in an on-board electrical system of a motor vehicle wherein, based on an evaluation of load requirements of at least one peak load consumer which is supplied from the on-board electrical system, exceptional situations are detected, and wherein, in the event of an exceptional situation, "modified current supply", which is realized by driving a switch device (comprising one or more switches), to an excitation coil of the generator, which excitation coil is formed from at least two coil elements which can be supplied with current individually, is performed.

In some embodiments, the apparatus comprises an evaluation device for evaluating load requirements of at least one peak load consumer, which is supplied from the on-board electrical system, and for detecting exceptional situations, and furthermore an exception control apparatus for implementing modified current supply to an excitation coil of the generator, which excitation coil is formed from at least two coil elements which can be supplied with current individually, which is realized by driving a switch device.

Some embodiments may include a generator, that is to say an externally excited electrical generator for an on-board electrical system of a motor vehicle, comprising an excitation coil which is formed from at least two coil elements, and comprising a drivable switch device for making possible current supply, which is modified depending on the switching state, to the excitation coil which is formed from the at least two coil elements which can be supplied with current individually.

In some embodiments, the "excitation coil" which is used for external excitation and therefore the properties thereof are designed such that they can be effectively changed during operation of the generator. The excitation coil may comprise at least two coil elements. The "ability to supply current individually" to these coil elements is intended to mean that the current flows through the individual coil elements are not changed in a manner defined exclusively by the excitation voltage, but rather the individual (at least two) current flows also depend on a switching state of the drivable switch device.

One example in this respect: if the excitation coil is formed, for example, from two coil elements which are connected in series and have a center tap, by way of example, a modification to the current supply can be realized by a suitable switch device in that either current is supplied to only one of the two coil elements or current is supplied only to the other coil element, or current is applied to both coil elements (in a series circuit). If the electrical properties (e.g., electrical resistance R and inductance L) of the two coil elements differ from one another, it is therefore possible for three different "excitation coil configurations" and therefore three different "current supplies" to be realized in this example depending on driving of the switch device. A changeable excitation coil configuration may provide that the so-called excitation time constant can be varied thereby as required. This will be explained further below in the description of an exemplary embodiment.

In summary, the present disclosure provides various methods and apparatuses in which rapid and reliable "tracking" of a prespecified setpoint output voltage by the actual output voltage of the generator can be achieved even in the case of abrupt and significant changes in the power requirement.

Figure 2:
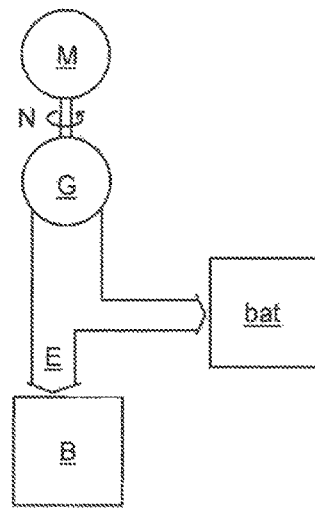
FIG. 2 shows a block diagram for illustrating an energy flow in an on-board electrical system of a motor vehicle for a recharging situation of an electrical energy store.

FIGS. 1 and 2 illustrate the basic problem of reliably supplying electrical energy E to an on-board electrical system B of a motor vehicle. An electrical generator G driven by a motor M (for example internal combustion engine of the motor vehicle), and also an electrical energy store bat (for example lead-acid rechargeable battery) which is coupled to the on-board electrical system B for buffering are available for this energy supply.

Here, the electrical generator G is driven in rotation by the motor M directly or by means of a step-up transmission. The rotation speed of this generator rotary drive is symbolized by N in FIGS. 1 and 2. FIG. 1 illustrates an operating situation, which is unfavorable, as, for example on account of a relatively low rotation speed N, the required energy E or electrical power can be delivered only by providing electrical energy both from the generator G and also from the energy store bat.

However, FIG. 2 illustrates an operating situation, which provides a relatively high rotation speed N, the energy of which is provided by the generator G is greater than the energy E which is required by the on-board electrical system B, so that a portion of the energy or power which is generated by the generator G can be used to recharge the electrical energy store bat.

The design of the generator G as an externally excited electrical generator advantageously makes it possible to influence the supply voltage which is output at the generator output and, respectively, also the electrical power which is available, apart from by changing the rotation speed N, also in that an excitation voltage Uerr, which drives the excitation current Ierr of the generator G, is controlled in accordance with requirements using known methods and apparatuses for setting the excitation voltage Uerr for the purpose of regulating an actual output voltage Ugen of the generator G at a predetermined setpoint output voltage Ugenset of the generator G.

Even though the known regulating methods and regulating apparatuses are highly suitable for regulating a desired on-board electrical system voltage Ugen (here, for example, in accordance with a battery voltage Ubat) in most operating situations, there may be deviations in the on-board electrical system voltage and, respectively, generator output voltage Ugen when abrupt significant changes in the energy requirement of the on-board electrical system B occur. In cases of this kind, the conventional regulation is often too slow to avoid undesired deviations in the actual output voltage Ugen from the setpoint output voltage Ugenset.

Figure 3:
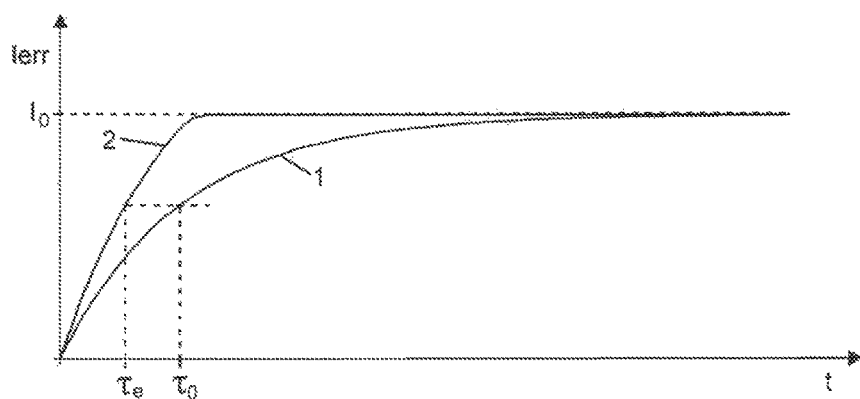
FIG. 3 shows a graph for illustrating different profiles of an excitation current Ierr of an externally excited electrical generator as a function of time t.

FIG. 3 illustrates the basic "inertia" of setting the excitation current Ierr by applying an excitation voltage Uerr to an excitation coil. Two exemplary profiles 1 and 2 of an excitation current Ierr with respect to time t are plotted in FIG. 3. The current profile 1 shows a case in which, starting from an excitation current Ierr=0 at t=0, the excitation current Ierr is increased by applying a constant excitation voltage Uerr, here a nominal on-board electrical system voltage (Uerr=Ubat=14 V) for example. If the inductance of the excitation coil, which is required for generating the excitation magnetic field, is denoted L and the non-reactive resistance of this excitation coil is denoted R, an asymptomatic approximation of the excitation current Ierr (t) at a final value $I_0$=Uerr/R is produced as is known.

A rate of increase can be characterized by a time constant $\tau$=L/R. This time constant $\tau$ corresponds to that time period which elapses until the excitation current Ierr has reached approximately 63% of the final value $I_0$. Therefore, the time constant $\tau$ prevents a delay-free change in the excitation current Ierr by the known setting of the excitation voltage Uerr within the scope of a regulation of the generator output voltage Ugen. The associated time constant is denoted $\tau_0$ for the current profile 1 in FIG. 3.

The current profile 2 in FIG. 3 will be discussed in more detail further below.

Various exemplary embodiments of methods and apparatuses for controlling an electrical generator G and, respectively, for controlling an excitation voltage Uerr applied to the generator G will be described in more detail below with reference to FIGS. 4 through 8, in which relatively large deviations in the actual output voltage Ugen from the setpoint output voltage Ugenset are avoided, in particular even in the case of abrupt and significant changes in the power requirement which is to be provided by the generator G.

Figure 4:
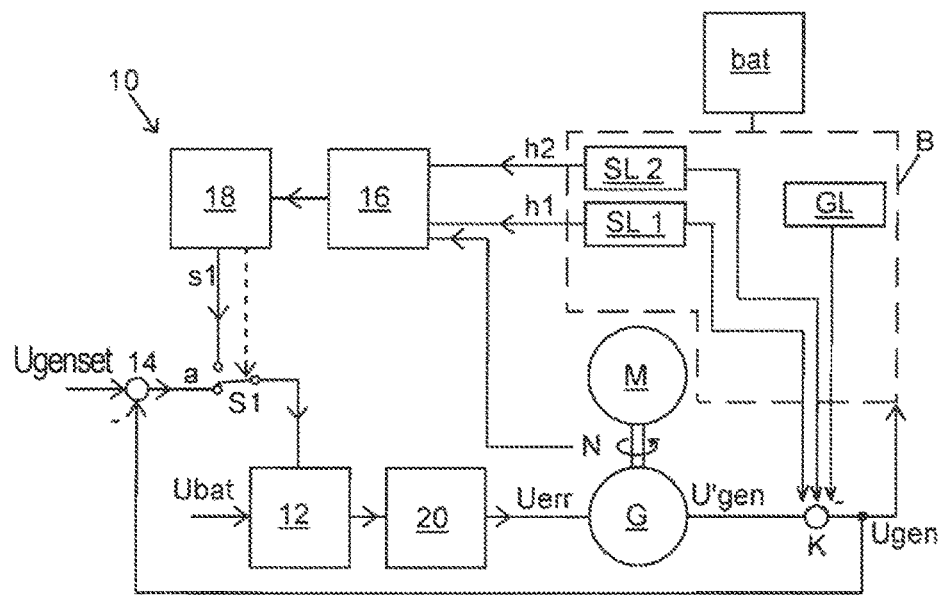
FIG. 4 shows a block diagram of an apparatus for controlling an externally excited electrical generator according to one exemplary embodiment of the invention.

FIG. 4 shows an example embodiment of an apparatus 10 for controlling an excitation voltage Uerr of an externally excited electrical generator G in an on-board electrical system B of a motor vehicle incorporating teachings of the present disclosure. The control process comprises setting the excitation voltage Uerr within the scope of a regulation of an actual output voltage Ugen of the generator G at a predetermined setpoint output voltage Ugenset of the generator G.

The apparatus 10 comprises a drivable DC/DC converter 12, which is supplied from the on-board electrical system B, for generating the excitation voltage Uerr for the generator G. The supply of the DC/DC converter 12 is symbolized in FIG. 4 by the supply with a battery voltage Ubat of a battery bat which buffer-stores the on-board electrical system B. In the normal case, the output voltage Ugen of the generator G corresponds to this battery voltage Ubat and, respectively, to a "nominal voltage" of the on-board electrical system B.

The on-board electrical system B is symbolized in FIG. 4 by a box which, in the schematic illustration of FIG. 4, contains a "basic load consumer" GL and a plurality of "peak load consumers", here denoted SL1 and SL2 by way of example. The basic load consumer GL symbolizes a totality of electrical consumers of the motor vehicle in question which, each on their own, have a relatively low power requirement and/or the connection and disconnection of which electrical consumers for operation purposes do not lead to an abrupt and at the same time significant change in the total power requirement of the on-board electrical system B. However, the two peak load consumers SL1, SL2 shown in FIG. 4 by way of example symbolize electrical loads in the on-board electrical system B, the connection and disconnection of each of which electrical loads leads to an abrupt and at the same time significant change in the total power requirement of the on-board electrical system B.

The "basic load consumer" GL can typically include, for example, consumers such as an on-board electronics system ("on-board computer"), lighting means (for example headlamps and interior lighting system), devices for ventilating and controlling the climate of the vehicle interior (for example climate-control system control actuators, seat heaters etc.). In contrast, consumers such as, for example, actuators for forced operation of a brake of the vehicle can be classified as "peak load consumers".

The circumstance that the battery bat and, respectively, the generator G are "loaded" by the power requirement of the (currently connected) consumers of the on-board electrical system B is taken into account in the symbolic system of FIG. 4 by a fictional output voltage Ugen being shown at the output of the generator G, said fictional output voltage being reduced to the actually provided output voltage Ugen on account of the actual "loading" of the electrical consumers GL, SL1, SL2. The circuit node K in FIG. 4 symbolizes this voltage-reducing effect of the consumers GL, SL1, SL2 at the output of the generator G (an internal resistance of the generator output, which internal resistance is always present in practice, is taken into consideration here). In this sense, the fictional output voltage Ugen could also be called the idle voltage (of the generator G under no load).

The generator G is driven in rotation by a motor M, for example an internal combustion engine (for example petrol or diesel engine) used to drive the motor vehicle, specifically at a rotation speed N. N is, for example, identical to the engine rotation speed or else (owing to the interconnection of a transmission) in a fixed transmission ratio in relation to said engine rotation speed.

The apparatus 10 further comprises a comparison device 14 (e.g., a subtraction node) for comparing the current generator output voltage (the actual output voltage Ugen) with a predetermined setpoint output voltage Ugenset, and to output a deviation signal a to a control input of the DC/DC converter 12. In the simplest case, and as illustrated, the deviation signal a is formed as the difference Ugenset−Ugen. However, in other embodiments, the deviation signal a could be defined in another way (typically, characteristic of a deviation between Ugenset and Ugen).

If the deviation signal a indicates that Ugen is smaller than Ugenset, the DC/DC converter 12 will output a higher excitation voltage Uerr, as a result of which the excitation current Ierr in the generator G then also increases, so that the output voltage Ugen also increases. Conversely, if the deviation signal a indicates that Ugen is greater than Ugenset, the DC/DC converter 12 will be driven to output a reduced excitation voltage Uerr, as a result of which the excitation current Ierr then also drops, so that the output voltage Ugen likewise drops.

Taking into account the deviation signal a as a drive signal for the DC/DC converter therefore results in regulation of the actual output voltage Ugen at the setpoint output voltage Ugenset. In the illustrated example, this regulation is a proportional regulation ("P regulator"). However, in some embodiments, more complicated regulation characteristics can also be used.

In some embodiments, the apparatus 10 comprises an evaluation device 16 for evaluating "load requirements" h1, h2 of the (in this example two) peak load consumers SL1 and SL2 supplied from the on-board electrical system B and, on the basis of this, for detecting "exceptional situations". In the illustrated example, each load requirement h1, h2 respectively comprises an item of information which is available to the peak load consumer SL1 and, respectively, SL2 in question immediately before it is actually activated and concerns the (additional) electrical power requirement associated with the activation of the said peak load consumer.

In the illustrated example, power requirements h1, h2 of this kind are communicated to the evaluation device 16 by means of a digital bus system of the motor vehicle, said evaluation device being in the form of a software-implemented functionality of a program-controlled device here. The bus system used may be, for example, a CAN bus, a LIN bus, or another suitable bus system, in particular a bus system according to another common standard.

The result of the evaluation performed by the evaluation device 16, for example, the information that there is a specific additional power requirement (quantified in h1 and, respectively, h2) for a specific time period (quantified in h1 and, respectively, h2), is communicated to an exception control device 18 of the apparatus 10 (for example, digital communication by means of a bus system or by internal communication within said program-controlled device in which the exception control device 18 is also implemented).

The exception control device 18 serves, in the case of an exceptional situation which is detected by the evaluation and the further information of the evaluation result, to implement "modified setting of the excitation voltage Uerr". The detection of an exceptional situation can be based, for example, on the expected additional power requirement exceeding a predetermined threshold value within a predetermined (relatively small) time period. Therefore, a measure which differs from the above-described pure regulation, which measure takes into account the abrupt and significant changes in the power requirement required in the exceptional case, can be taken as a result of the modified setting.

In the illustrated example, the modified setting of the excitation voltage Uerr provides a temporary interruption in the regulation and a setting of the excitation voltage Uerr depending on an exception control signal s1 which is generated by the exception control device 18 depending on the result of the preceding evaluation. To this end, the exception control device 18, as symbolized by a dashed action arrow in FIG. 4, drives a switch S1 in such a way that, rather than the deviation signal a which is output by the comparison device 14, the exception control signal s1 which is generated by the device 18 is output to the control input of the DC/DC converter 12 for the time period of the exceptional situation. Apparatus 10, therefore, provides "anticipatory" driving or "pilot control" of the DC/DC converter 12 by means of the components 16, 18, S1. This, in practice, leads to a considerable improvement in the dynamic performance of the generator G.

In other words, with the apparatus 10, an abrupt and significant change in the power requirement does not lead to a "reaction" to a deviation between Ugen and Ugenset, which deviation is produced as a result of this change in the power requirement, but rather an intervention is made in the setting mechanism by "pilot control" as early as at a time at which the additional power requirement has not yet been created, but is more or less immediately imminent. The exception control signal s1 may be generated in a program-controlled manner. For optimum definition and, respectively, calculation of the exception control signal s1 is completed, when, as illustrated in FIG. 4, the (current) rotation speed N of the generator G is detected and this rotation speed N is taken into account by the evaluation device 16 within the scope of the evaluation. Consequently, it is possible to "register" imminent load requirements and regulate out said load requirements as required.

DC/DC converter 12 allows the excitation voltage Uerr to be set as required, even to negative voltage values and to voltage values with an absolute value which is higher than the on-board electrical system voltage (corresponding to the battery voltage Ubat). In other words, the DC/DC converter 12 is configured as a "step-up actuator" which therefore allows an output voltage Uerr to be generated not only, as is customary, in a range of from 0 V to the value Ubat (for example 14 V), but rather beyond this range.

In the illustrated example, a range of from −60 V to +60 V is provided for the excitation voltage Uerr which can be generated, wherein a voltage limiter 20 is provided for ensuring these limits. A maximum positive voltage value of +60 V and a minimum negative voltage value of −60 V are available in this example. The output voltage of the DC/DC converter 12 is supplied to the voltage limiter 20 in order to deliver the excitation voltage Uerr (which has been accordingly limited as required) to the generator G.

The increased value range of Uerr may be additionally explained with reference to FIG. 3. The further current profile 2 shown in FIG. 3 illustrates an increase in the excitation current Ierr which is considerably more rapid than in the case of the current profile 1, using a larger excitation voltage Uerr. In order that the excitation current Ierr does not "overshoot" a prespecified maximum excitation current, such as $I_0$ for example, the excitation voltage Uerr is accordingly reduced shortly before or when this maximum current is reached. If the time period which is required in order to reach approximately 63% of $I_0$ is defined as the excitation time constant for the current profile 2, this results in an (apparent) reduction in the excitation time constant of $\tau_0$ (current profile 1) to $\tau_e$ (current profile 2).

The voltage limiting which is implemented by the voltage limiter 20 in the illustrated example provides that a "regulation gain", with which the signal (deviation signal a or exception control signal s1) input at the control input of the DC/DC converter 12, is converted into a corresponding voltage value at the output of the DC/DC converter 12, can also be selected to be so high that the voltage limiter 20, as it were, caps the voltage signal which is otherwise (in extreme situations) output by the DC/DC converter.

In practice, the DC/DC converter 12, together with the voltage limiter 20, can be structurally combined with components of the generator G (rotor, stator). As an alternative, the components 12, 20 can also be provided separately from the generator G. In some embodiments, one or more further apparatus components, for example the components 16, 18, S1, 20, can also be structurally combined with the generator G (for example in a common housing) within the scope of the invention.

A mathematical "generator model", which is realized by software for example, can be used in the case of more complicated regulation, wherein electrical and/or magnetic variables in the region of the generator (e.g., magnetomotive force, excitation current, rotation speed, internal resistance, etc.) are continuously monitored and taken into account by the device 16 and/or the device 18 when processing information.

The same reference numerals are used for similarly acting components, in each case with a lowercase letter added in order to distinguish the various examples. In this case, the discussion focuses only on the differences with respect to the exemplary embodiment or exemplary embodiments already described and for the rest reference is hereby expressly made to the description of previous exemplary embodiments.

Figure 5:
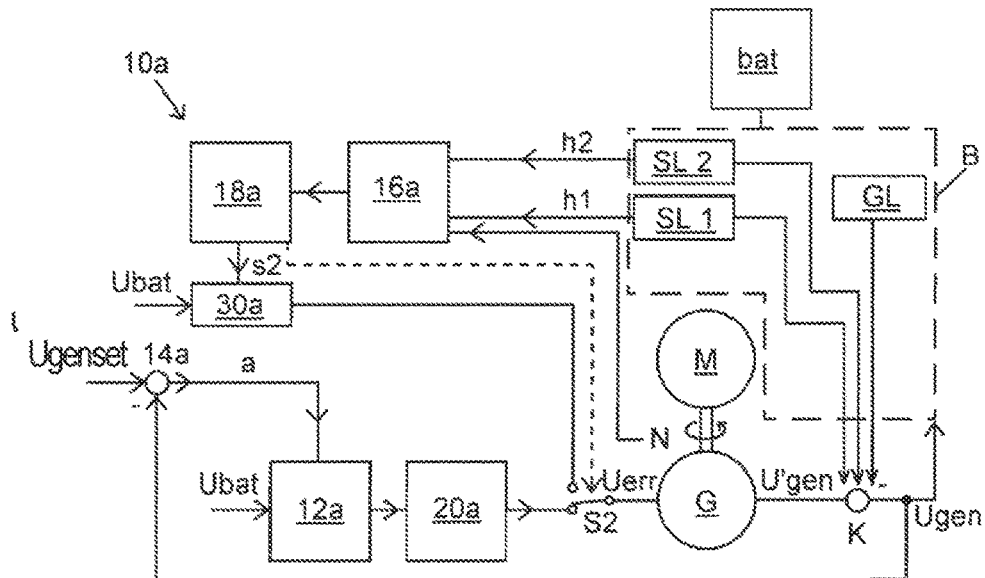
FIG. 5 shows a block diagram of an apparatus for controlling an externally excited electrical generator according to a further exemplary embodiment of the invention.

FIG. 5 shows an apparatus 10a according to a further embodiment. In contrast to the apparatus 10, the apparatus 10a comprises, for the purpose of modified setting of an excitation voltage Uerr in detected exceptional situations, a drivable DC/DC converter 30a for this purpose and supplied by the battery voltage Ubat and which, at a control input, receives an exception control signal s2 from an exception control device 18a. The DC/DC converter 30a generates, at its output, the excitation voltage Uerr, which is required for the exceptional situation, depending on the exception control signal s2. This excitation voltage Uerr is then passed to the generator G by switching over a switch S2, this likewise being performed by the exception control device 18a. Therefore, after the switch S2 is switched over, the generator G no longer receives the excitation voltage Uerr from a DC/DC converter 12a, which is used for normal situations and has a voltage limiter 20a connected downstream, but rather from the DC/DC converter 30a which is provided specifically for this purpose.

Even in the case of the apparatus 10a illustrated in FIG. 5, the DC/DC converter 12a and the voltage limiter 20a can also be structurally combined with the generator G. In some embodiments, it is possible, in the case of an embodiment of the kind shown in FIG. 5, to structurally combine the components 16a, 18a, 30a and possibly S2, for example in a modular "exception controller" which, once again, can be arranged separately and can be connected firstly to the peak load consumer or consumers and secondly to the switch S2 and, respectively, to the generator G for realizing the configuration illustrated in FIG. 5. In some embodiments, the components 16a, 18a, 30a and S2 are structurally combined with the generator G (for example within a common housing). If there is only one single peak load consumer, it is also possible, as an alternative, to provide the components 16a, 18a, 30a (and less preferably the switch S2) structurally in combination with said peak load consumer.

In exemplary embodiments according to FIGS. 4 and 5, the regulation which is provided for normal situations is ultimately entirely suspended in exceptional situations in each case by a switchover operation (of switch S1 or S2). In some embodiments, the control loops which are active for normal situations also remain effective in exceptional situations, wherein however, in exceptional situations, an exception drive signal which is output by the exception control device 18 or 18a is "admixed" at a suitable point in the control loop in question. In the examples according to FIGS. 4 and 5, addition nodes, which implement this admixing, could respectively be provided for this purpose instead of the switches S1 and, respectively, S2.

Figure 6:
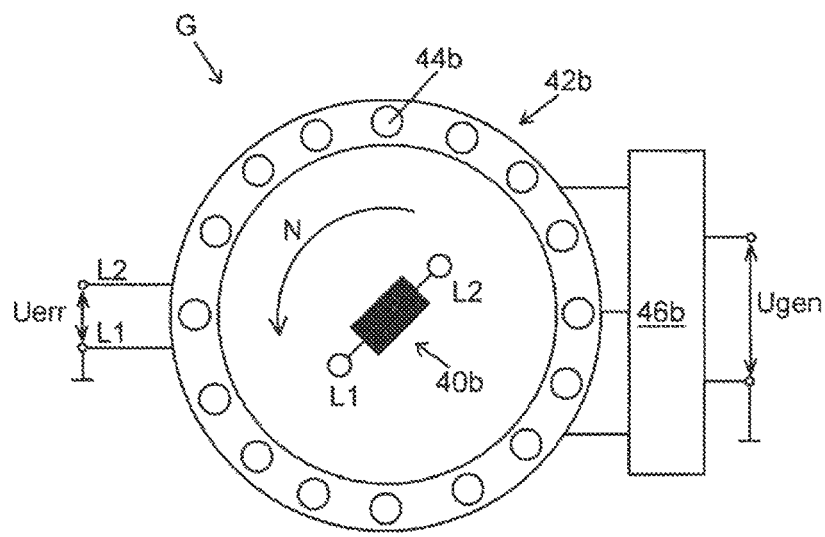
FIG. 6 is a schematic illustration of an externally excited electrical generator of conventional design.

FIG. 6 schematically shows the design of a conventional electrical generator G, as can be used in the control apparatuses and control methods described here. In the illustrated example, an excitation voltage Uerr is applied to connections L1, L2 of the generator G and transmitted by means of slip rings (not illustrated) to corresponding connections L1, L2 of an excitation coil 40b which rotates at a rotation speed N during operation of the generator G. The excitation voltage Uerr therefore creates a corresponding excitation current Ierr through the excitation coil 40b and, on account of the rotation of this excitation coil 40b, a rotating magnetic field.

A stator 42b, which surrounds the rotating excitation coil 40b or a rotor, contains a plurality of induction coils, the windings of which are schematically shown by 44b. Three induction coils of this kind with a mutual angular offset of in each case 120° are provided in the illustrated example, so that the rotating magnetic field is used for induction of a three-phase AC voltage which results from corresponding interconnection of the induction coils. This three-phase AC voltage is converted into the DC voltage Ugen (which is required for the DC on-board electrical system) by means of a rectifier 46b.

A generator G of the kind illustrated in FIG. 6 (for example a so-called claw pole generator) can be provided for example as the generator G used in the examples according to FIG. 4 (apparatus 10) and FIG. 5 (apparatus 10a).

Figure 7:
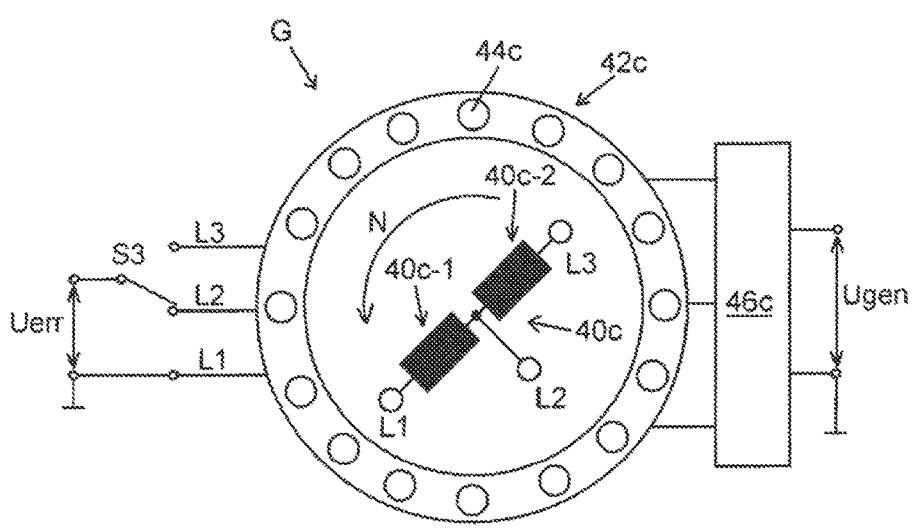
FIG. 7 is a schematic illustration of a generator which is of modified construction and can be switched over according to a first variant.

FIG. 7 shows an additional embodiment of electrical generator G. Generator G includes an excitation coil 40c comprising an interconnection (here: series circuit) of a plurality of (here: two) individual coils 40c-1, 40c-2, wherein more than two (here: three) excitation coil connections L1, L2 and L3 are electrically connected to corresponding stationary external connections L1, L2 and L3 by means of slip rings (not illustrated) on the rotor, and wherein the interconnected circuit of the individual coils 40c-1 and 40c-2 and the connections L1, L2 and L3 which are routed out are provided in such a way that current can be supplied to the excitation coil 40c, which is formed from the individual coils 40c-1, 40c-2, in a selectively modifiable manner by driving a switch device, here a changeover switch S3.

In the embodiment of FIG. 7, the coil connection L2 forms a center tap of the series circuit formed from the individual coils 40c-1, 40c-2. Consequently, the current supply to the excitation coil 40c can be modified by the switch S3 in such a way that, in a first switching state, an excitation voltage Uerr is applied to the connections L1 and L2, so that current is supplied only to the individual coil 40c-1. In contrast, after the switch S3 has been switched over, a second switching state can be realized, in which the excitation voltage Uerr is applied to the connections L1 and L3, so that current is simultaneously supplied to both individual coils 40c-1, 40c-2. In a generator G with an excitation coil, such as excitation coil 40c for example, made up of a plurality of individual coils is that the electrical properties, the resulting inductance L and also the resulting non-reactive resistance R can be varied even during operation of the generator G by driving the switch device in question (here switch S3 for example).

The excitation time constant τ is dependent on these electrical properties of the excitation coil. It is therefore possible to switch over between different excitation time constants given a suitable design of the individual coils and the interconnection thereof. In the present example of the two individual coils 40c-1, 40c-2 arranged in series, these individual coils need not be designed identically in relation to one another.

A generator G of the kind illustrated in FIG. 7 can be operated in conjunction with a control method and, respectively, a control apparatus of the kind already described. In this case, the control method or the control apparatus may be modified to the effect that, in the case of an exceptional situation (or owing to the exception control device), driving of said switch device can be implemented for the purpose of modifying the supply of current. The generator G illustrated in FIG. 7 can therefore be used in the apparatuses 10 (FIG. 4) and 10a (FIG. 5) for example, as the generator G which is driven there, wherein the exception control device 18 or 18a additionally implements driving of the switch S3 in this case. Corresponding criteria for driving a specific switching state can be applied by the exception control device 18 or 18a in a program-controlled manner.

Figure 8:
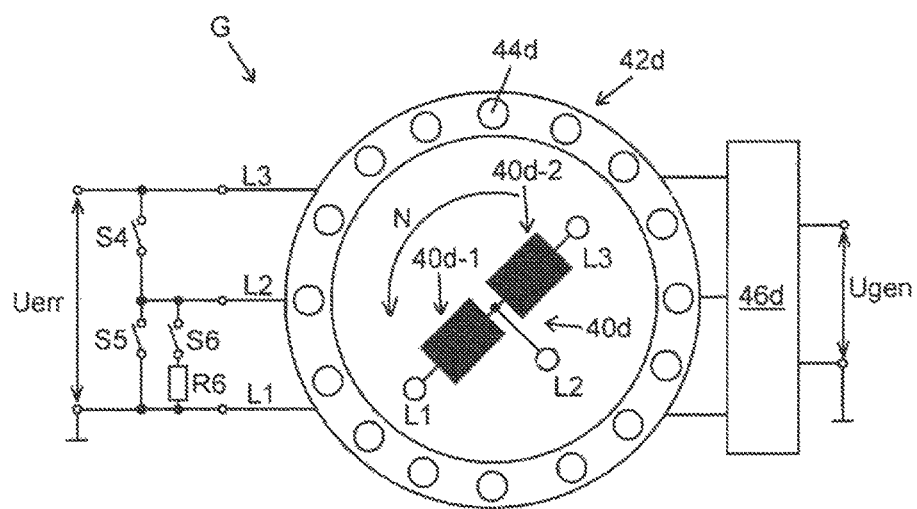
FIG. 8 is a schematic illustration of the generator which is of modified construction and can be switched over according to a second variant.

FIG. 8 shows an electrical generator G according to a further embodiment. Like the generator G already described with reference to FIG. 7, the generator G shown in FIG. 8 also includes an excitation coil 40d formed from a series circuit comprising two individual coils 40d-1, 40d-2, wherein two outer connections L1, L3 and a center tap L2 for applying an excitation voltage Uerr are again routed out. However, a switch device may be formed from not only one switch, but rather from three switches S4, S5 and S6, in the case of the generator G of FIG. 8.

In this switch device, the excitation voltage Uerr is applied to the connections L1 and L3, wherein a low-impedance connection between the connections L3 and L2 and, respectively, the connections L1 and L2 can be selectively created by means of the switches S4 and S5 in order to "deactivate" the associated individual coils 40d-2 and, respectively, 40d-1. Therefore, three different switching states corresponding to three modified current supply variants are already possible with these two switches S4, S5, specifically current supply to the first individual coil 40d-1, current supply to the second individual coil 40d-2 and also current supply to both individual coils 40d-1 and 40d-2 (the further, fourth switching state, in which S4 and S5 would be closed, is not expedient).

Further switching states, in the case of which the individual coil 40d-1 is connected in parallel with a non-reactive resistor R6, can be provided by means of the switch S6. In a departure from FIG. 8, it would also be possible to provide, for example, a further series circuit comprising a switch and a non-reactive resistor between the connections L2 and L3 in order to realize further switching states.

In addition, when the switch device, as an alternative or in addition to a drivable parallel circuit of a non-reactive resistor and an individual coil, allows the option of a drivable series circuit comprising a non-reactive resistor and at least one individual coil (to this end, it is possible to provide in at least one of the "connection supplies", that is to say in FIG. 8 for example on the connection lines at L1, L2 and L3, a parallel circuit comprising a non-reactive resistor and a drivable switch, so that, when the switch is open, the non-reactive resistor is active and, when the switch is closed, said resistor is bridged with a low impedance). Furthermore, in the case of a switch device of this kind, the apparatus may include a drivable switch (that is to say possibly even without a resistor connected in parallel) in a connection line, in order to thereby allow particularly rapid "disconnection" of the excitation voltage supply to one or more relevant individual coils.

The generator G according to FIG. 8 can also be operated in conjunction with a control method and, respectively, a control apparatus of the kind described above. During operation by means of the apparatus 10 (FIG. 4) or 10a (FIG. 5), it would only be necessary for the exception control device 18 or 18a in question to be designed to drive the switches S4, S5 and S6 too.

What is claimed is:

1. A method for controlling an excitation voltage of an externally excited electrical generator in an on-board electrical system of a motor vehicle, the method comprising:
    setting the excitation voltage for the generator at a first value corresponding to a first regulation scheme for of an actual output voltage of the generator at a predetermined setpoint output voltage of the generator with a processor of an electronic controller;
    evaluating load requirements of at least one peak load consumer receiving electricity from the on-board electrical system with the processor;
    identifying exceptional situations when the load requirements exceed a first threshold with the processor, wherein an exceptional situation includes at least one load requirement beyond a boundary of the first regulation scheme; and
    in the event of an exceptional situation, setting a second regulation scheme including an associated temporary excitation output voltage of the generator beyond the boundary of the first regulation scheme.

2. The method as claimed in claim 1, further comprising:
    communicating the load requirements by means of a digital bus system of the motor vehicle; and
    evaluating the load requirements with a program-controlled device.

3. The method as claimed in claim 1, wherein the temporary excitation output voltage includes a temporary interruption in the regulation and setting of the excitation voltage in response to an exception control signal generated depending on the evaluation.

4. The method as claimed in claim 1, further comprising setting the temporary excitation voltage to negative voltage values and/or to voltage values with an absolute value greater than an on-board electrical system voltage.

5. A method for operating an externally excited electrical generator in an on-board electrical system of a motor vehicle, the method comprising:
    setting the excitation voltage for the generator below a first threshold corresponding to a first regulation scheme for an actual output voltage of the generator at a predetermined setpoint output voltage of the generator with a processor of an electronic controller;
    evaluating load requirements of at least one peak load consumer supplied from the on-board electrical system with the processor; and
    identifying exceptional situations when the load requirements exceed the first threshold with the processor, wherein an exceptional situation includes at least one load requirement beyond a boundary of the first regulation scheme; and
    in the event of an exceptional situation, setting a second regulation scheme including an associated temporary excitation output voltage of the generator beyond the boundary of the first regulation scheme;
    wherein setting the associated temporary excitation output voltage of a modified current supply includes driving a switch device to an excitation coil of the generator;
    wherein the excitation coil comprises at least two coil elements supplied with current individually.

6. An apparatus for operating an externally excited electrical generator in an on-board electrical system of a motor vehicle, the method comprising:
    a drivable DC/DC converter supplied from the on-board electrical system, for generating an excitation voltage for the generator;
    a comparison device comparing an actual output voltage of the generator with a predetermined setpoint output voltage of the generator and outputting a deviation signal to the DC/DC converter to regulate the actual output voltage at the setpoint output voltage; and
    an evaluation device evaluating load requirements of at least one peak load consumer supplied from the on-board electrical system and used to detect exceptional situations when the load requirements exceed a first threshold, wherein an exceptional situation includes at least one load requirement beyond the setpoint output voltage.

7. An apparatus as claimed in claim 6, further comprising an exception control device implementing a modified setting of the excitation voltage in the event of an exceptional situation.

8. An apparatus as claimed in claim 6, wherein the DC/DC converter allows setting the excitation voltage to negative voltage values and/or to voltage values with an absolute value which is increased in relation to the on-board electrical system voltage.

9. An apparatus as claimed in claim 6, wherein the evaluation device for evaluating load requirements of at least one peak load consumer is supplied from the on-board electrical system; and
    further comprising an exception control device implementing modified current supply to an excitation coil of the generator formed from at least two coil elements supplied with current individually by driving a switch device.

* * * * *